United States Patent [19]
Yemini

[11] Patent Number: 5,884,982
[45] Date of Patent: Mar. 23, 1999

[54] WHEEL ASSEMBLY

[75] Inventor: Zvi Yemini, Tel Aviv, Israel

[73] Assignee: Z.A.G. Industries, Rosh Haayin, Israel

[21] Appl. No.: 781,018

[22] Filed: Jan. 9, 1997

[51] Int. Cl.⁶ .................................................. B60B 37/12
[52] U.S. Cl. ........................................... 301/111; 301/121
[58] Field of Search ................................... 301/111, 112, 301/118, 119, 120, 121, 122

[56] References Cited

U.S. PATENT DOCUMENTS

| | | | |
|---|---|---|---|
| 3,740,100 | 6/1973 | Perego | 301/121 |
| 5,358,314 | 10/1994 | Spadotto | 301/122 X |
| 5,603,555 | 2/1997 | Dickey et al. | 301/112 X |

*Primary Examiner*—Russell D. Stormer
*Attorney, Agent, or Firm*—Mark Friedman

[57] ABSTRACT

A wheel assembly for use with carts employs a sleeve element as an intermediate member between a central axle and both the wheel and the cart body. The sleeve element has an inner recess shaped to receive an end portion of the axle and a first external surface for rotatably engaging within a hole in the cart such that a part of the sleeve element functions as a bearing disposed between the axle and the hole. The sleeve element also has a resilient catch element for retaining it within the hole such that the axle is prevented from moving longitudinally while being free to rotate relative to the cart body. The sleeve element also provides a substantially cylindrical external surface for rotatable mounting of the wheel. The sleeve element simultaneously retains the axle in a defined axial position relative to the cart body, maintains a defined spacial relationship between the wheel and the cart body, and guarantees reliable freedom of rotation by allowing rotation of both of the axle relative to the cart body and of the wheel relative to the axle. The sleeve element also renders the entire wheel assembly a simple manually assembled "snap-fit".

17 Claims, 4 Drawing Sheets

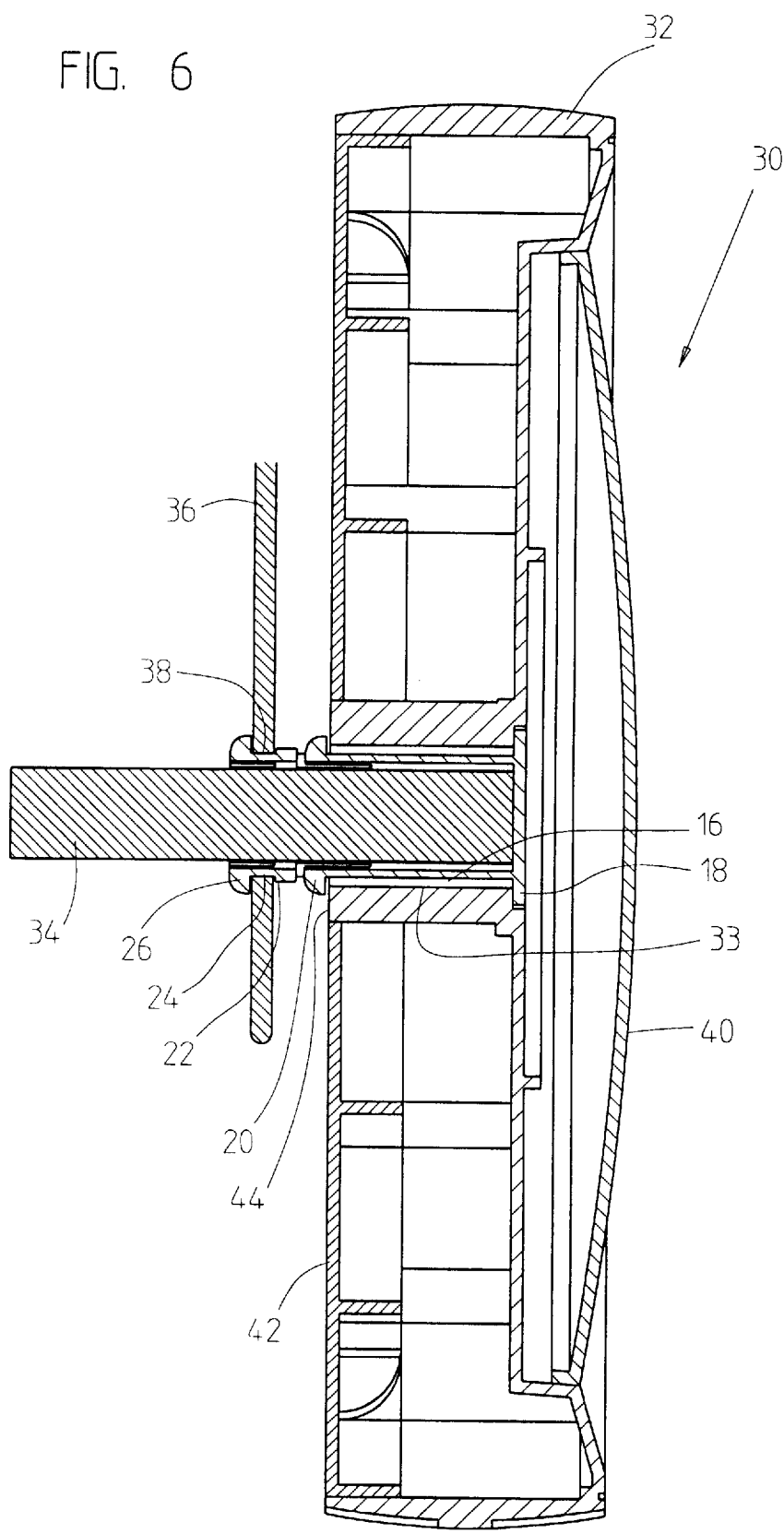

WHEEL ASSEMBLY

FIELD AND BACKGROUND OF THE INVENTION

The present invention relates to push-carts and the like and, in particular, it concerns a wheel assembly which is both strong and easily assembled for use with such carts.

It is known to provide a wide variety of carts, trolleys, baby carriages, storage boxes and wheel barrows for domestic, garden and travel use. For convenience of reference, all such devices will be referred to collectively as "carts". Most carts have one or more axle rotatably mounted within the body of the cart, with a pair of wheels attached to opposite ends of the axle. The wheels are typically attached by welding or bolting, both labor intensive and thus expensive assembly techniques.

A further shortcoming of carts in which wheels are rigidly attached to a common axle is lack of maneuverability. Since the wheels cannot turn independently, such a cart is inconvenient for even gentle cornering, and incapable of turning on the spot. The familiar single wheel design conventionally preferred for wheel barrows, on the other hand, is highly maneuverable, but suffers from a lack of stability.

In order to improve the maneuverability of carts having paired-wheels, it is possible to mount the wheels so as to be rotatable with respect to the axle. However, such a construction raises further structural and assembly complications since both travel of each wheel along the axle and of the axle within the cart body must be prevented to ensure smooth operation.

There is therefore a need for a low cost, easily assembled wheel assembly which allows independent rotation of each wheel.

SUMMARY OF THE INVENTION

According to the present invention there is provided a wheel assembly for attachment to an axle passing through a hole in a cart body, the assembly including: a wheel having a central bore and a sleeve element for positioning within the central bore. The sleeve element includes: (i) an axial recess extending along a major part of the length of the sleeve element, the recess be shaped to receive the axle, (ii) an end wall for defining an extent of full insertion of the axle within the axial recess, (iii) a substantially cylindrical external surface for rotatably engaging within the bore, (iv) an outwardly extending radial flange for abutting an external surface of the wheel, (v) a first resilient catch for abutting an internal surface of the wheel, and (vi) a second resilient catch for engaging an edge of the hole in the cart body.

BRIEF DESCRIPTION OF THE DRAWINGS

The invention is herein described, by way of example only, with reference to the accompanying drawings, wherein:

FIG. 6 is a side cross-sectional view showing the wheel assembly of FIG. 5 attached to a cart.

DESCRIPTION OF THE PREFERRED EMBODIMENTS

Figure 1:
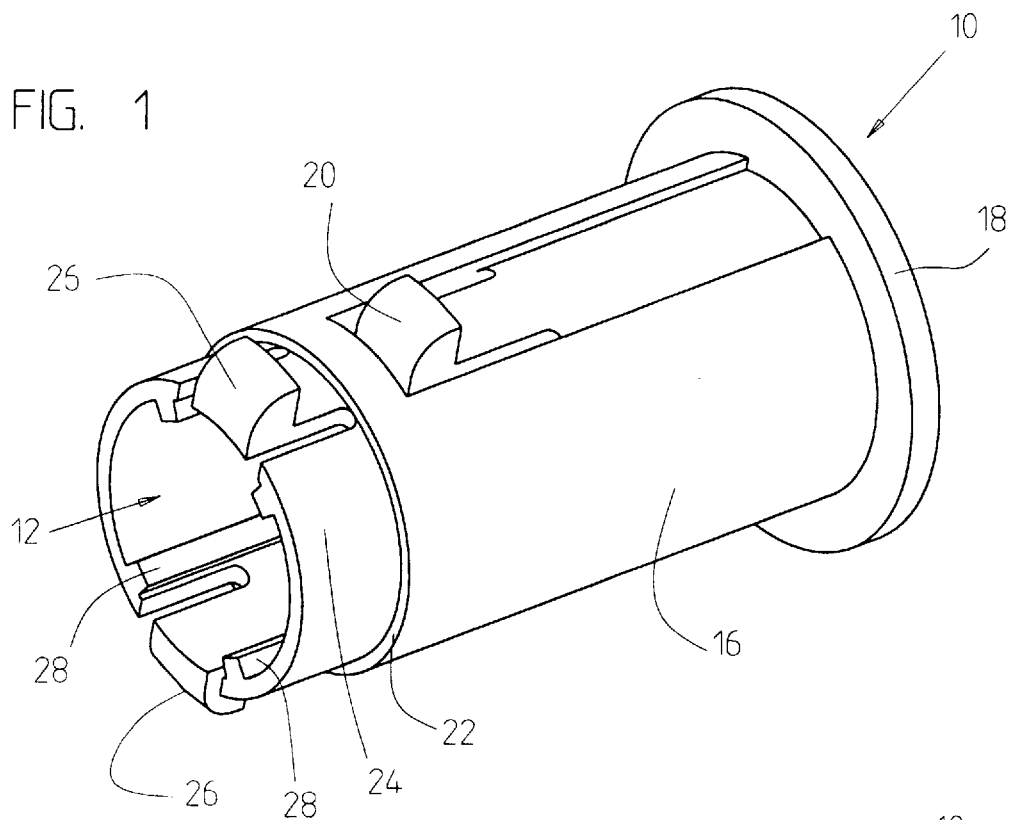
FIG. 1 is a first perspective view of a sleeve element for use in a wheel assembly, constructed and operative according to the teachings of the present invention.
Figure 2:
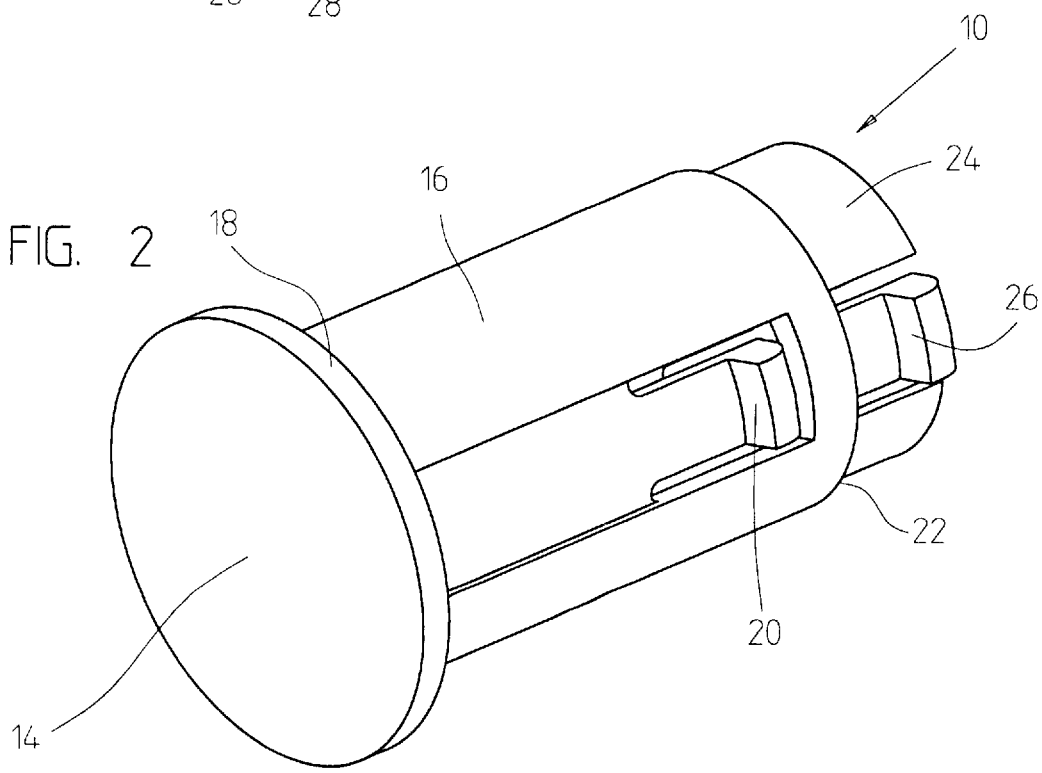
FIG. 2 is a second perspective view of the sleeve element of FIG. 1.
Figure 3:
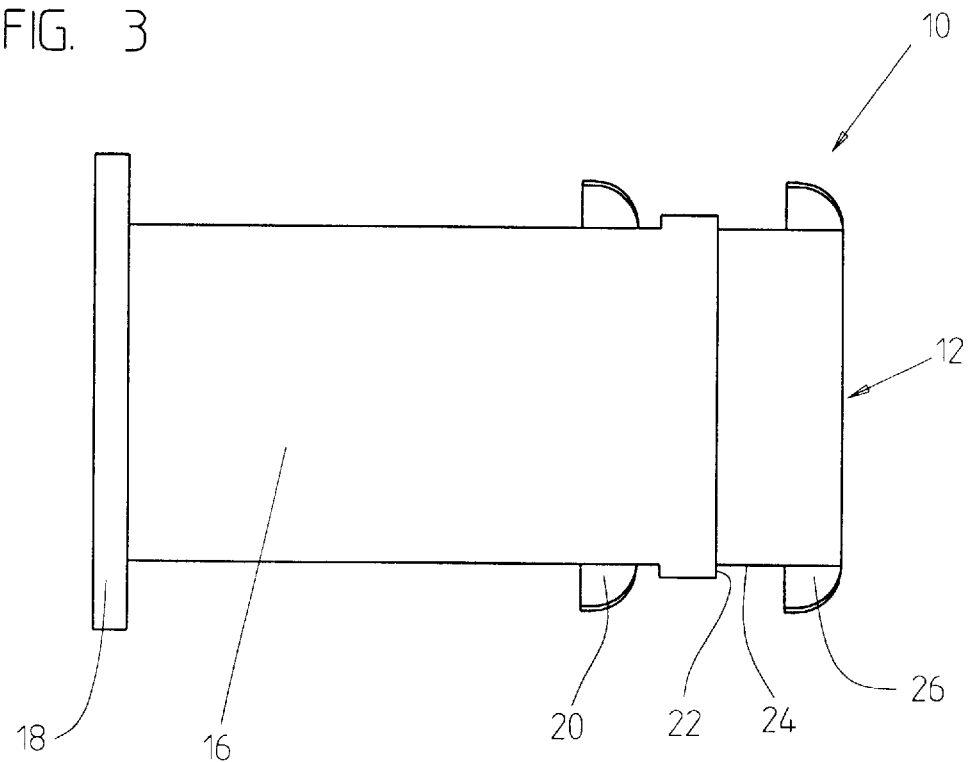
FIG. 3 is a side view of the sleeve element of FIG. 1.

The present invention relates to a wheel assembly for use with carts.

The principles and operation of a wheel assembly according to the present invention may be better understood with reference to the drawings and the accompanying description.

The present invention provides a very strong, easily assembled wheel assembly which allows each wheel to turn substantially independently. The wheel assembly employs a sleeve element as an intermediate member between a central axle and both the wheel and the cart body.

According to a preferred embodiment of the present invention, the sleeve element simultaneously performs multiple functions: firstly, it retains the axle in a defined axial position relative to the cart body; secondly, it maintains a defined spacial relationship between the wheel and the cart body; and thirdly, it guarantees reliable freedom of rotation by allowing rotation of both of the axle relative to the cart body and of the wheel relative to the axle. Furthermore, the sleeve element renders the entire wheel assembly a simple manually assembled "snap-fit".

Referring now to the drawings, FIGS. 1–4 show a sleeve element, generally designated 10, for use in a wheel assembly for carts, constructed and operative according to the teachings of the present invention.

Generally speaking, sleeve element 10 features an axial recess 12 extending along a major part of its length and terminating in an end wall 14. A first part 16 of the external surface of sleeve element 10 provides a substantially cylindrical surface. External surface 16 is delineated at one end by an outwardly extending radial flange 18. Towards the other end, sleeve element 10 features a number of resilient catch elements 20. Beyond catch elements 20, the external surface of sleeve element 10 features an inward step which forms a shoulder 22 followed by a secondary substantially cylindrical external surface 24 provided with a number of secondary catch elements 26.

Preferably, sleeve element 10 is formed from a polymer material with a low coefficient of friction. Examples of suitable materials include, but are not limited to, nylon and acetal resins. Alternatively, various metals or metal alloys may be used.

Turning now to the features of sleeve element 10 in more detail, axial recess 12 is designed to receive an axle fully inserted until the end of the axle abuts end wall 14. Although described here as a "wall", end wall 14 is not necessarily a continuous flat surface. In fact, any transverse projection which defines a fully inserted position of an axle within axial recess 12 may be used. Preferably, the inner surface of axial recess 12 has features such as longitudinal ribs 28 for locking sleeve element 10 in contact with the axle.

External surface 16 is the primary mounting surface for the central bore of a wheel. The wheel is prevented from slipping off sleeve element 10 by flange 18 which abuts the outer side of the wheel, i.e., the side of the wheel facing away from the cart body. On the inner side of the wheel, i.e., the side facing the cart body, resilient catch elements 20 lodge against an inner surface of the wheel to prevent it from slipping inwards.

Figure 4:
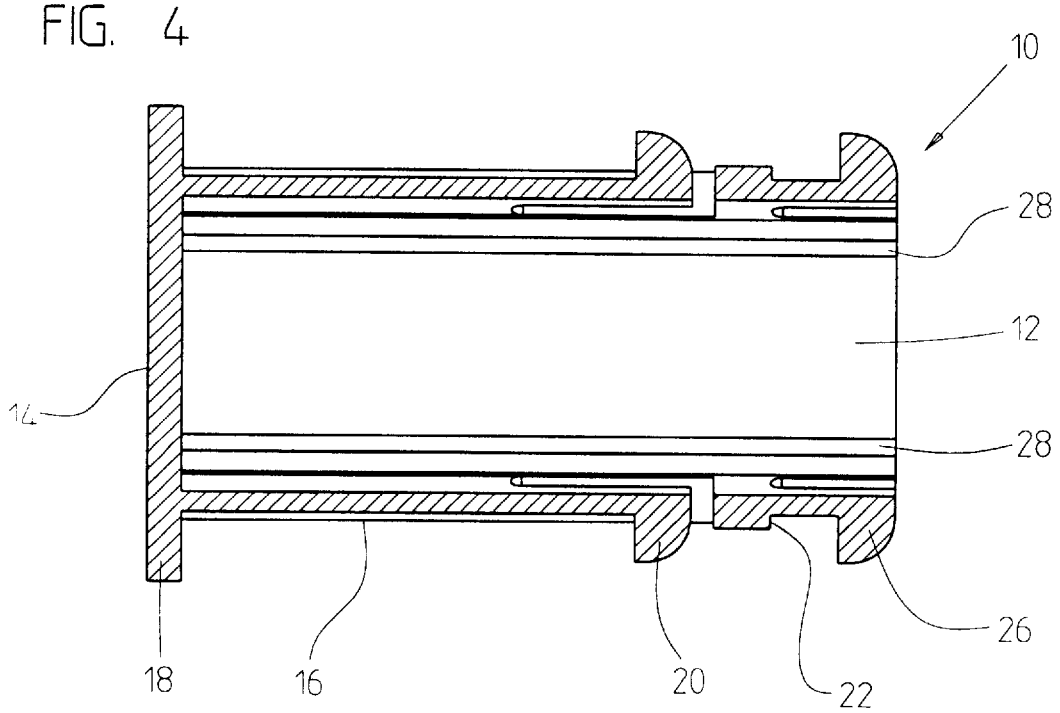
FIG. 4 is a side cross-sectional view through the sleeve element of FIG. 1.

Resilient catch elements 20 and 26 are preferably formed as radially projecting tabs at the ends of flexible tongues (see FIGS. 1 and 4). The projecting tabs are preferably rounded or wedge-shaped on their front faces, i.e., the leading surfaces in their direction of insertion, to facilitate assembly. Their rear faces, i.e., the surfaces which lock against the wheel or the cart body, are typically flat.

Typically, resilient catch elements 20 and 26 are formed as an integral part of sleeve element 10. The flexibility is provided by radial thinning of the tongue portion, taking advantage of the intrinsic resilience of the material from which sleeve element 10 is produced.

Figure 5:
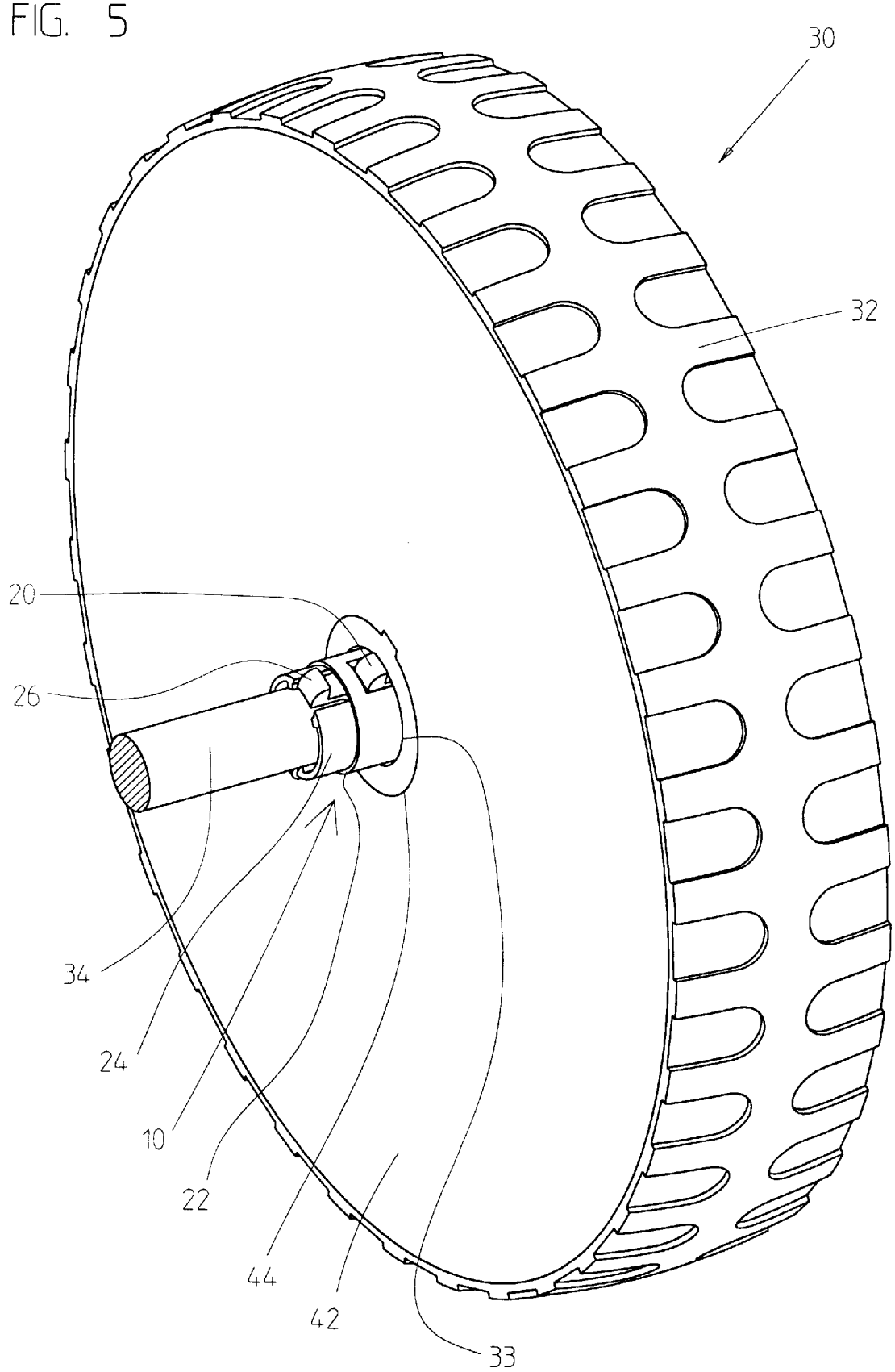
FIG. 5 is a perspective view of a wheel assembly, constructed and operative according to the teachings of the present invention, including the sleeve element of FIG. 1.

FIG. 5 shows a wheel assembly, generally designated 30, constructed and operative according to the teachings of the present invention, made up of a wheel 32 mounted on sleeve element 10 which is, in turn, mounted on an axle 34. This view illustrates how catch elements 20 retain wheel 30 against flange 18, thereby leaving secondary external surface 24 together with shoulder 22 and secondary catch elements 26 available for attachment to the cart body.

Turning briefly to the features of wheel 32 itself, this may be any type of wheel with a central bore 33, and having suitable dimensions and structural strength for the intended application. In a preferred embodiment of the present invention, wheel 32 is formed from a structurally strong polymer material. Suitable materials include, but are not limited to, polypropylene. The wheel is typically a radially ribbed molded structure. Additional wedge-on or clip-on covers 40 (see FIG. 6) and 42 are preferably provided for attachment to the outer and inner faces of wheel 32, respectively. Inner cover 42 features a central aperture 44 to mate with the wall of the central cylindrical bore of wheel 32. Covers 40 and 42 serve both for aesthetic effect and to prevent collection of dirt around flange 18 or within wheel 32. Alternatively, other materials such as metal, metal alloys or wood may be used.

FIG. 6 shows wheel assembly 30 attached to a part of a cart 36. As can be seen here, external surface 24 is formed to fit within a circular hole 38 in cart 36 such that sleeve element 10 acts as a bearing interposed between axle 34 and hole 38. Once inserted in this position, shoulder 22 abuts the exterior surface of cart 36 adjacent to hole 38, and secondary catch elements 26 engage the interior surface around hole 38 such that entire wheel assembly 30 is retained rotatably engaged within hole 38.

It will be readily apparent that the assembly procedure of wheel assembly 30 is extremely simple. First, sleeve element 10 is pushed through central bore 33 of wheel 32 until resilient catch elements 20 click into position against the inner surface of wheel 32 adjacent to bore 33. Wheel 32 and sleeve element 10 are then securely attached although free to rotate relative to each other. Then, with inner cover 42 in place, wheel assembly 30 is pushed on to axle 34 until axle 34 is fully inserted within recess 14 and resilient catch elements 26 click into position against the rear surface surrounding hole 38. Finally, outer cover 40 is clipped into place. The entire assembly procedure may be performed manually in no more than a few seconds.

Once assembled, the entire wheel assembly 30 is held firmly against axial movement by the combination of shoulder 22 and resilient catch elements 26, thereby maintaining the desired spacial relationship between the wheel and the cart body. The combination of these features with end wall 14 also serves to retain axle 34 in a defined axial position relative to the cart body. Specifically, the use of two wheel assemblies 30 at opposite ends of an axle serves to fix the axial position of the axle completely.

Wheel assembly 30 also guarantees reliable freedom of rotation by allowing rotation of both of sleeve element 10 relative to cart body 36, and of wheel 32 relative to sleeve element 10. The latter possibility also allows for independent rotation of wheels mounted on a common axle, thereby providing great maneuverability.

It will be appreciated that the above descriptions are intended only to serve as examples, and that many other embodiments are possible within the spirit and the scope of the present invention.

What is claimed is:

1. A wheel assembly for attachment to an axle passing through a hole in a cart body, the assembly comprising:

(a) a wheel having a central bore; and (b) a sleeve element for positioning within said central bore, said sleeve element having:

(i) an axial recess extending along a major part of the length of said sleeve element, said recess being shaped to receive the axle, (ii) an end wall for defining an extent of full insertion of the axle within said axial recess, (iii) a substantially cylindrical external surface for rotatably engaging within said bore, (iv) an outwardly extending radial flange for abutting an external surface of said wheel, (v) a first resilient catch for abutting an internal surface of said wheel, and (vi) a second resilient catch for engaging an edge of the hole in the cart body.

2. The wheel assembly of claim 1, wherein said sleeve element also has a shoulder for abutting a surface of the cart body adjacent to the hole so as to space said wheel from the cart body.

3. The wheel assembly of claim 1, wherein said sleeve element is formed from a low friction polymer material.

4. The wheel assembly of claim 3, wherein said low friction polymer material is nylon.

5. The wheel assembly of claim 3, wherein said low friction polymer material is an acetal resin.

6. The wheel assembly of claim 4, wherein said wheel is formed from a structurally strong polymer material.

7. The wheel assembly of claim 5, wherein said structurally strong polymer material is polypropylene.

8. A cart comprising:

(a) a cart body having at least one circular hole of a given inner diameter;

(b) an axle deployed within said at least one hole, said axle having an external diameter less than said inner diameter of said at least one hole;

(c) a sleeve element having an inner recess shaped to receive an end portion of said axle and a first external surface for rotatably engaging against an inner surface of one of said holes such that a part of said sleeve element functions as a bearing disposed between said axle and said hole, said sleeve element also providing a resilient catch element for retaining said sleeve element within said hole such that said axle is prevented from moving longitudinally while being free to rotate with said sleeve element relative to said cart body, said sleeve element further providing a substantially cylindrical second external surface; and (d) a wheel rotatably mounted on said second external surface.

9. The cart of claim 8, wherein said recess terminates in an end wall for defining a fully inserted position of said axle within said sleeve element.

10. The cart of claim 8, wherein said sleeve element further features an outwardly extending radial flange for abutting an external surface of said wheel.

11. The cart of claim 8, wherein said sleeve element further features a second resilient catch element for abutting an internal surface of said wheel.

12. The cart of claim 8, wherein said sleeve element further features a shoulder for abutting a surface of said cart body adjacent to said hole so as to space said wheel from said cart body.

13. The cart of claim 8, wherein said sleeve element is formed from a low friction polymer material.

14. The cart of claim 13, wherein said low friction polymer material is nylon.

15. The cart of claim 13, wherein said low friction polymer material is an acetal resin.

16. The cart of claim 14, wherein said wheel is formed from a structurally strong polymer material.

17. The cart of claim 15, wherein said structurally strong polymer material is polypropylene.

* * * * *